US012430160B2

United States Patent
Shivaganga Nagaraju et al.

(10) Patent No.: US 12,430,160 B2
(45) Date of Patent: Sep. 30, 2025

(54) USER-CONTROLLED FIRMWARE FOR HOSTED VIRTUAL MACHINES

(71) Applicant: Microsoft Technology Licensing, LLC, Redmond, WA (US)

(72) Inventors: Gangadhara Swamy Shivaganga Nagaraju, Kirkland, WA (US); Pushkar Vijay Chitnis, Bothell, WA (US); Bo Zhang, Raleigh, NC (US); Amar Nad Rudra Gowda, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 533 days.

(21) Appl. No.: 17/968,621

(22) Filed: Oct. 18, 2022

(65) Prior Publication Data

US 2024/0126586 A1    Apr. 18, 2024

(51) Int. Cl.
*G06F 9/455*     (2018.01)
*G06F 8/65*      (2018.01)
*G06F 21/00*     (2013.01)
*G06F 21/12*     (2013.01)
*G06F 21/30*     (2013.01)
*G06F 21/31*     (2013.01)
*G06F 21/57*     (2013.01)

(52) U.S. Cl.
CPC ............ *G06F 9/45558* (2013.01); *G06F 8/65* (2013.01); *G06F 21/00* (2013.01); *G06F 21/121* (2013.01); *G06F 21/30* (2013.01); *G06F 21/31* (2013.01); *G06F 21/57* (2013.01); *G06F 21/572* (2013.01); *G06F 2009/45562* (2013.01); *G06F 2009/4557* (2013.01)

(58) Field of Classification Search
None
See application file for complete search history.

(56) References Cited

U.S. PATENT DOCUMENTS 9,471,367 B1 *  10/2016  Hu .................. G06F 9/4401
10,990,373 B2 *  4/2021  Olderdissen ............ G06F 8/71

OTHER PUBLICATIONS

Palmer et al., "Ownership and Control of Firmware in Open Compute Project Devices", IBM Research Division, Nov. 9, 2018. (Year: 2018).*
"LinuxBoot", Retrieved from: https://web.archive.org/web/20220613095927/https://www.linuxboot.org/page/faq/, Jun. 13, 2022, 2 Pages.
Krieger, et al., "What are Security Policies, Initiatives, and Recommendations?", Retrieved from: https://learn.microsoft.com/en-us/azure/defender-for-cloud/security-policy-concept, Oct. 12, 2022, 7 Pages.

(Continued)

*Primary Examiner* — Qing Yuan Wu
(74) *Attorney, Agent, or Firm* — Schwegman Lundberg & Woessner, P.A.

(57) ABSTRACT

A computer implemented method includes receiving first firmware information at a hosting environment identifying that a user has selected user-controlled firmware for user virtual machines to be hosted on the hosting environment. A copy of the user-controlled firmware is obtained and a user virtual machine is deployed that includes the user-controlled firmware. The user-controlled firmware is locked against changes by the hosting environment absent receiving permission from the user.

20 Claims, 6 Drawing Sheets

(56) References Cited

OTHER PUBLICATIONS

Krieger, et al., "What is Microsoft Defender for Cloud?", Retrieved from: https://learn.microsoft.com/en-us/azure/defender-for-cloud/defender-for-cloud-introduction, Oct. 12, 2022, 10 Pages.

* cited by examiner

USER-CONTROLLED FIRMWARE FOR HOSTED VIRTUAL MACHINES

BACKGROUND

A hosting environment provides hardware and deployment services for creating and executing virtual machines. The deployment services may be provided by software to both create and run virtual machines. Such software may be referred to as a hypervisor that enables multiple virtual machines to run on the hardware and to share resources, like memory and processing resources.

The virtual machines may include firmware, which is code used to interface an operating system to the hardware. The firmware may be modified for different hardware platforms and may be updated from time to time. Apps may be loaded on top of the operating system to provide desired services to a user.

Some users today would like their virtual machines to be confidential from the hosting environment. Users also have concerns about vulnerabilities in the hosting environment that make up the dependencies for virtual machines to launch. Some hosting environments provide trusted platform modules in default firmware that can be used to encrypt data in memory, data that is stored, or both. Such encryption can help assure users that the virtual machines and the data they process are held in confidence. However, the user may not trust the software dependencies in the hosting environment.

SUMMARY

A computer implemented method includes receiving first firmware information at a hosting environment identifying that a user has selected user-controlled firmware for user virtual machines to be hosted on the hosting environment. A copy of the user-controlled firmware is obtained and a user virtual machine is deployed that includes the user-controlled firmware. The user-controlled firmware is locked against changes by the hosting environment absent receiving permission from the user.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

An improved hosting environment for providing virtual machines to users includes the ability for users to select and control virtual machine firmware by locking the firmware from modification without permission of the user. The ability to select and control virtual machine firmware provides users with greater assurance that the virtual machines can be trusted, reducing the chances for malicious code to be introduced as well as providing confidentiality of data processed and stored by the virtual machine.

The ability for a user to control firmware also enables the user to generate their own code for the firmware as opposed to using proprietary host environment firmware that they cannot verify the code is safe. User-controlled firmware also allows customers/users to make informed decisions about the type and version of the firmware deployed. Different firmware options and configurations may be used to control and minimize component and service dependencies and thus control/minimize a trusted computing base.

Figure 1:
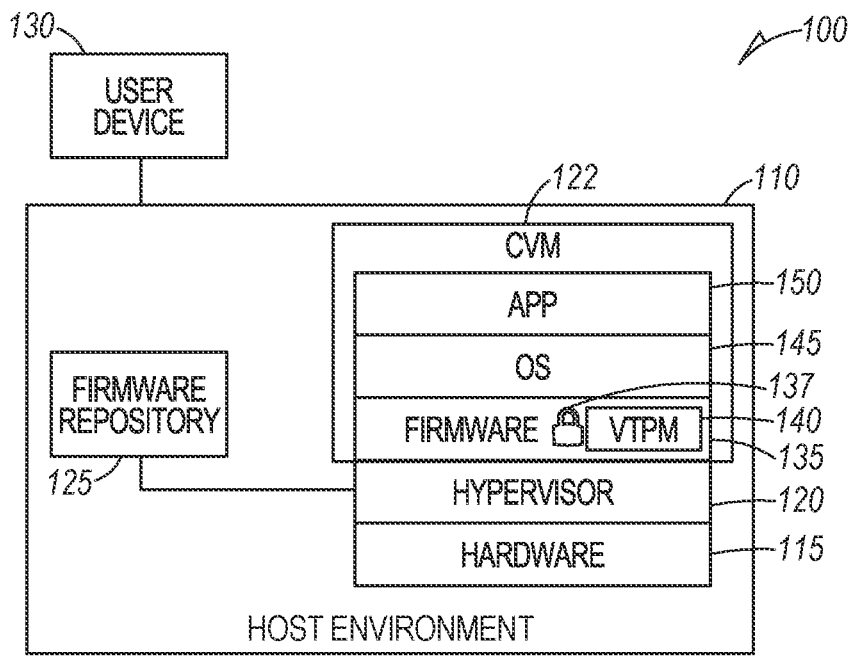
FIG. 1 is a block diagram of a system for hosting virtual machines with user-controlled firmware according to an example embodiment.

FIG. 1 is a block diagram of a system 100. System 100 may include a host environment 110 for providing computing resources for the creation and execution of virtual machines for users. Host environment 110 includes hardware 115, such as processors from one or more different processor suppliers. A hypervisor 120 may be used to provision and manage one or more virtual machines, such as virtual machine 122, which may be a confidential virtual machine. A firmware repository 125 may include a default firmware for interfacing to the hardware 115. Different default firmware may be included for each different processor used to implement hardware 115.

In one example, a user at user device 130 may select or provide user-controlled firmware 135 to the hypervisor 120 for provisioning one or more copies of virtual machine 122. The user-controlled firmware 135 is locked from modification as indicated lock symbol 137. In order to change the user-controlled firmware 135, permission from the user or user device 130 is required. Confidentiality of the virtual machine 122 may be provided by a virtual trusted platform module (vTPM) 140 which may be used to encrypt information that is stored and accessible to the virtual machine 122.

Virtual machine 122 may include an operating system 145 that interfaces to the user-controlled firmware 135, and one or more applications 150 that run on the operating system 145. The vTPM 140 provides encryption services.

Figure 2:
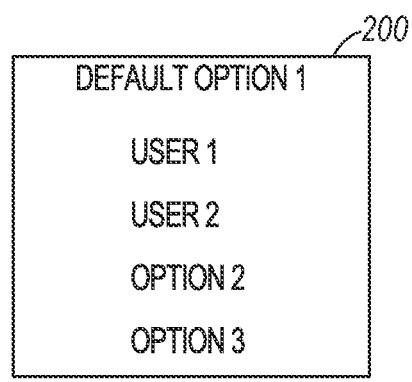
FIG. 2 is list of firmware options that may be included in firmware repository according to an example embodiment.

FIG. 2 is list 200 of firmware options that may be included in firmware repository 125. The list 200 may be presented to a user with checkboxes or other means for allowing a user to select a firmware option. A user may select an option to be provisioned as the user-controlled firmware, which will be locked upon provisioning. A default option 1 may be provided and managed by the host environment 110 to operate on the hardware 115 processor used in host environment 110. The default option 1 may be selected with or without designation of being user-controlled. If not user-controlled, the host environment 110 may update the option 1 firmware without user approval.

In some examples, where different hardware options are provided, there may be multiple default options. One or more user options, shown as user 1 and user 2 may also be provided by the user. The user 1 or user 2 option may be developed or otherwise obtained by the user and provided for storing in the firmware repository 125. Other options may be provided for selecting as either user-controlled firmware or not, such as option 2 and option 3 shown at 200.

Figure 3:
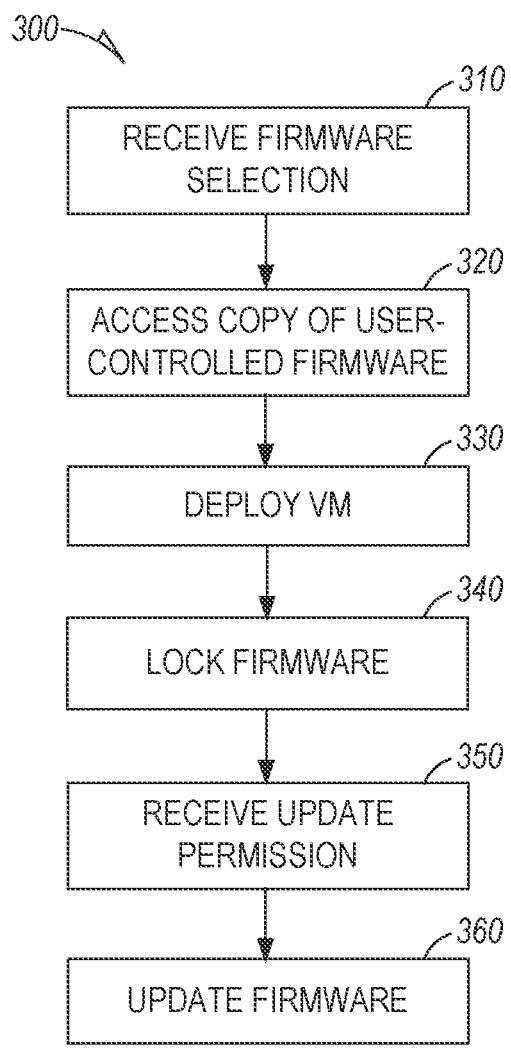
FIG. 3 is a flowchart illustrating a computer implemented method for providing user-controlled firmware in virtual machines according to an example embodiment.

FIG. 3 is a flowchart illustrating a computer implemented method 300 for providing user-controlled firmware in virtual machines. Method 300 begins at operation 310 by receiving first firmware information at a virtual machine hosting environment identifying that a user has selected user-controlled firmware for user virtual machines to be hosted on the hosting environment. The first firmware information may be received by receiving an indication that the user desires to use user-controlled firmware. The first firmware information may also be received by receiving input from a user device indicating host environment supported firmware to use and that the user desires the selected firmware to be user-controlled. In one example, the user-controlled firmware may be open source firmware.

A cope of the user-controlled firmware is obtained at operation 320, either from a firmware repository or from the user device. Obtaining a copy of the user-controlled firmware may include receiving an uploaded copy of the user-controlled firmware at the hosting environment and storing it in a firmware repository, or identifying an existing copy in the firmware repository and accessing the existing copy.

A user virtual machine is deployed at operation 330. The deployed virtual machine includes the user-controlled firmware. At operation 340, the user-controlled firmware is locked against changes by the hosting environment absent receiving permission from the user. In one example, the user virtual machine comprises a confidential virtual machine, which may include a virtual trusted platform module (vTPM).

In one example, the user-controlled firmware is auditable by the user via a hash of the user-controlled firmware. Any changes to the user-controlled firmware will result in the hash changing, indicating that the firmware has been changed.

Method 300 may also include receiving permission to update the user-controlled firmware at operation 350 and applying an update to the user-controlled firmware at operation 360 in response to receiving permission.

Figure 4:
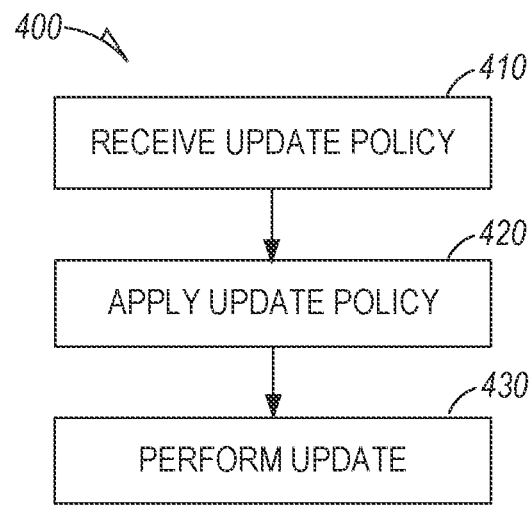
FIG. 4 is a flowchart illustrating a computer implemented method of updating user-controlled firmware according to an example embodiment.

FIG. 4 is a flowchart illustrating a computer implemented method 400 of updating user-controlled firmware. Method 400 begins at operation 410 by receiving a user defined update policy. The user defined update policy may set forth conditions for allowing an update to the user-controlled firmware, such as a requirement for permission from the user, or for allowing various types of updates without permission. At operation 420, the user defined update policy is applied to determine whether or not to update the user-controlled firmware. The user-controlled firmware is updated in response to successful application of the update policy at operation 430.

Figure 5:
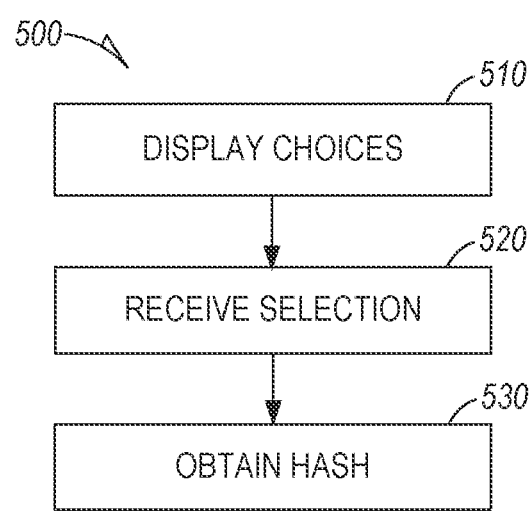
FIG. 5 is a flowchart illustrating a computer implemented method of receiving first firmware information according to an example embodiment.

FIG. 5 is a flowchart illustrating a computer implemented method 500 of receiving first firmware information. Method 500 begins at operation 510 by generating a display of multiple choices of firmware for user selection. The choices may include default firmware, previously provided user-controlled software, or yet to be provided user-controlled software. A selection of one of the multiple choices is received at operation 520. The selection may also include an indication that the user desires the selected firmware to be user-controlled firmware.

An original hash of the selected firmware may be generated at operation 530 for use in determining whether or not the selected firmware is subsequently modified without user permission. This determination may be performed by generating new hash on current firmware using the same hash generation algorithm. If the new hash does not match the original hash, the firmware has been modified.

Figure 6:
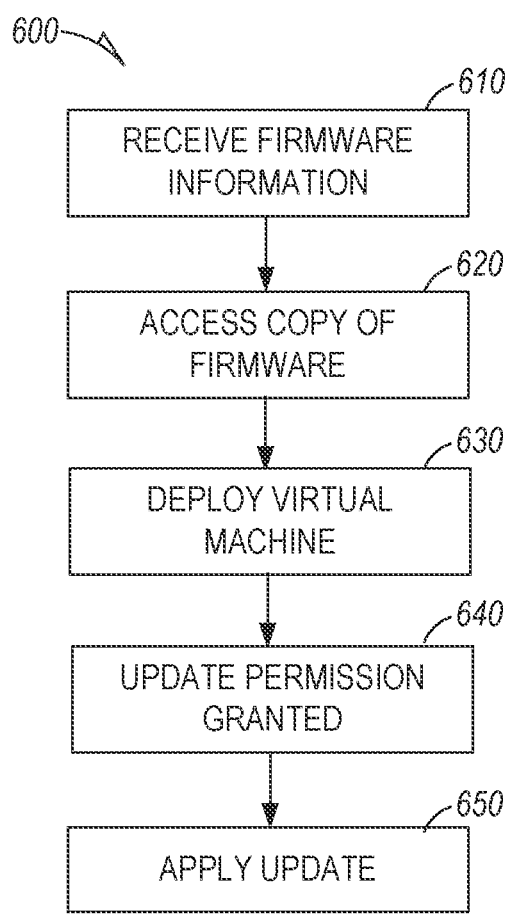
FIG. 6 is a flowchart illustrating an alternative computer implemented method for providing user-controlled firmware in virtual machines according to an example embodiment.

FIG. 6 is a flowchart illustrating an alternative computer implemented method 600 for providing user-controlled firmware in virtual machines. Method 600 begins at operation 610 by receiving first firmware information at a hosting environment identifying that a user has selected user-controlled firmware for user virtual machines to be hosted on the hosting environment. At operation 620, a copy of the user-controlled firmware is accessed, such as from a firmware repository. A user virtual machine that includes the user-controlled firmware is deployed at operation 630. At operation 640, a firmware update is identified. The firmware update may be an update to a default firmware.

At operation 640, method 600 determines if user permission has been granted to apply the firmware update to the user-controlled firmware. If permission has been granted, and the update is for the user-controlled firmware, the user-controlled firmware update is applied to the user-controlled firmware at operation 650. If the user has not indicated that the firmware is used-controlled firmware, the update may be applied without permission in the course of normal updating of host environment managed firmware.

Default firmware in some host environments may have service dependencies and is not ideal for scenarios focused on easy audit and management by customers. For confidential virtual machines with user-controlled or managed firmware, options to customers may include the use of a measured boot based on a central processing unit (CPU) and CPU generated reports. The simplified firmware may be designed with no direct service dependencies.

In one example, user-controlled firmware and associated build tools may be open sourced with reproducible builds to allow customers to completely audit their firmware trusted computing base. Since the firmware has no direct service dependencies, no other component/service needs to be audited to trust the firmware. A trusted confidential virtual machine (CVM) stack and configuration may be reflected within the CPU report.

Figure 7:
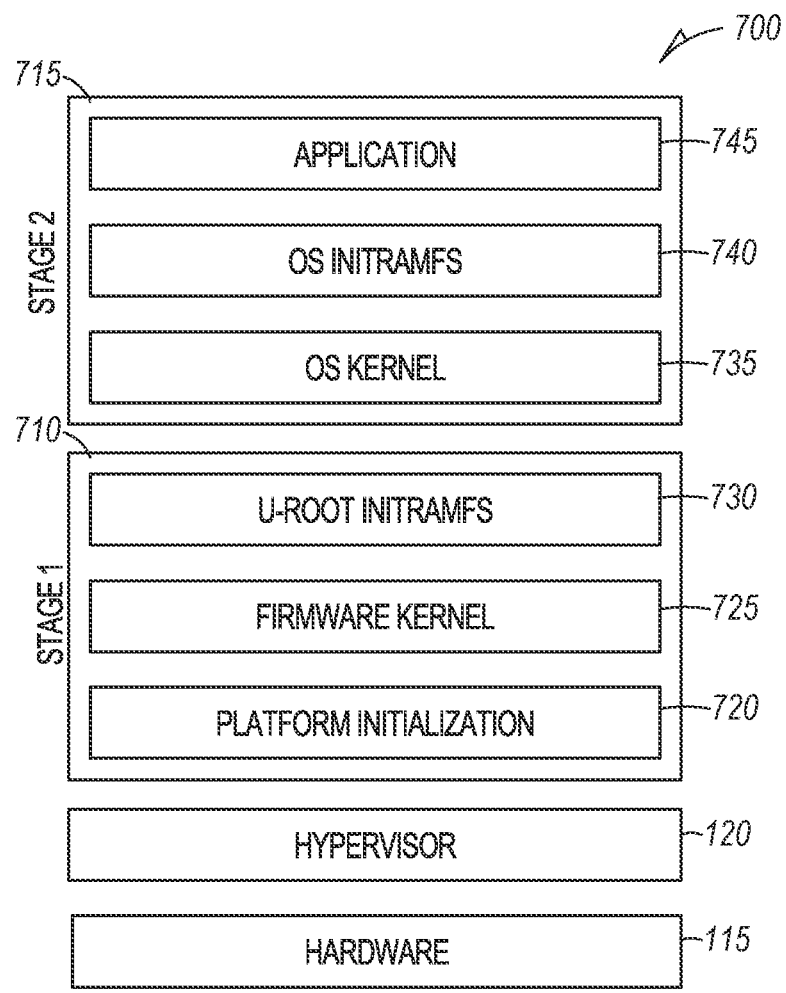
FIG. 7 is a block diagram of multistate boot flow for a confidential virtual machine deployment having user-controlled firmware according to an example embodiment.

FIG. 7 is a block diagram of an example multistate boot flow 700 using for example, Linuxboot, in a confidential virtual machine deployment having user-controlled firmware. Two boot stages, a first stage 710 and a second stage 715 are shown. The first stage 710 is for booting the user-controlled firmware and includes platform initialization at 720, firmware kernel loading at 725, and U-root initiation at 730.

Hypervisor 120 initializes user memory layout and CPU state during platform initialization at 720. The memory layout may contain firmware kernel and initramfs (initial root file system). Pages and measures are locked. Measurements can be reflected in hardware attestation reports.

Firmware kernel loading 725 includes loading the kernel with minimal device support. The kernel loads initramfs CPIO (a copy in and out Unix utility) to form an initial root file system and executes init 730. U-root Initramfs are booted by executing U-root init. Init fetches the hardware report and verifies configuration meta data. Stage 2 kernel and initramfs are also verified. KEXEC (a kernel execute call) stage 2 kernel is also called.

Stage 2 includes loading operating system Kernel 735, operating system initramfs 740 and application 745.

Linuxboot may be used in one example for confidential virtual machine deployments for customer managed, user-controlled firmware flows have several benefits including auditability where all linux devs are firmware auditors. Drivers may be the same within the operating system and firmware. Safety and performance benefits include the use of initrd, a temporary root file system used during boot which is written in "go" which provides memory safety and parallelization.

Figure 8:
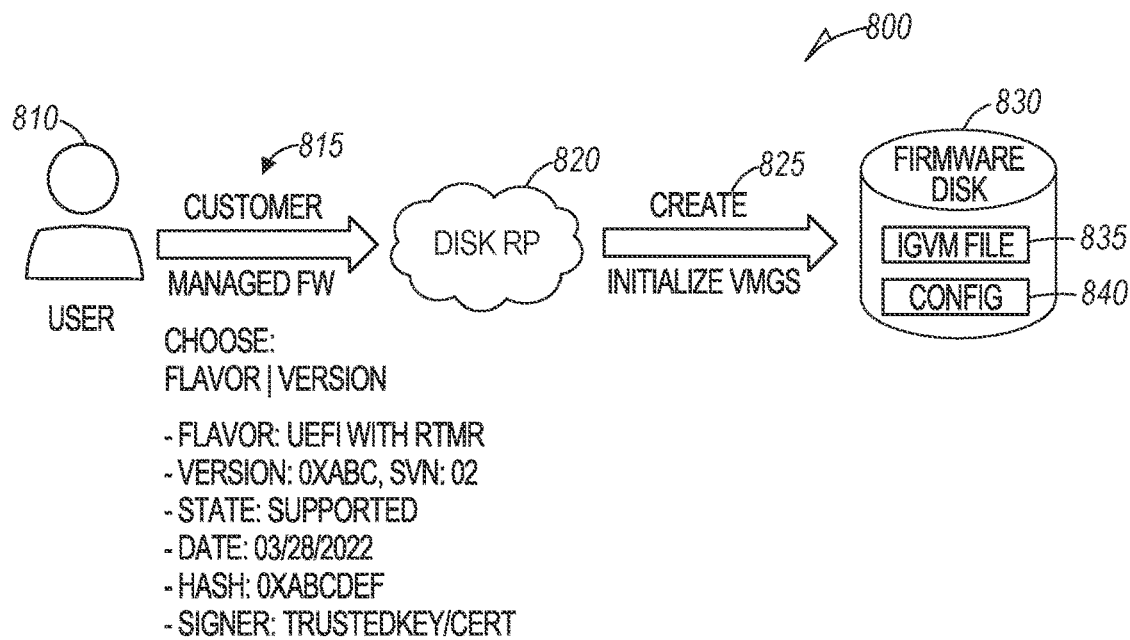
FIG. 8 is a flow diagram illustrating deployment at of a confidential virtual machine using user-controlled firmware according to an example embodiment.

FIG. 8 is a flow diagram illustrating deployment at 800 of a confidential virtual machine using user-controlled firmware. A user via a user system 810 may first select a user-controlled firmware at 815. In one example, the selected firmware may include UEFI (Unified Extensible Firmware Interface is a specification for a software program that connects a computer's firmware to its operating system) with runtime measurement registers (RTMR), a version number such as 0xABC, SVN:02, a state such as supported, a date, such as Mar. 28, 2022, a hash such as 0xABCDEF, and a signer such as trustedkey/cert.

A control plane of the host environment will initialize a firmware disk blob at 820, disk RP (resource provider) with the customer selected firmware disk (containing a security state of the virtual machine components) embedded with the system firmware binary. Upon deployment, a virtual machine worker process will use the packaged firmware to create at 825, a blank virtual machine guest system disk 830, and boot into a confidential virtual machine. The system disk 830 will include an isolated guest virtual machine (IGVM) file 835 and a config file 840 that includes parameters for use in booting the confidential virtual machine. The IGVM file 835 includes the initial state of the virtual machine to boot the confidential virtual machine.

Updates may occur in a similar manner, with permission first obtained, and instead of creating and initializing the virtual machine guest system, simply replace the VMGS file in the virtual machine guest system disk 830.

The policies may push notifications for customer initiated remedial action for several different firmware states. For stale firmware, a notification is generated if a firmware is a year old and a new firmware version (for the same firmware flavor) exists. The default may be set to 1 year or other time period which may be selected based on the firmware stability. Insecure firmware may result in a notification being generated if a newer firmware version (for the same firmware flavor) exists with higher security rating. Deprecated firmware may cause a notification to be generated if a firmware is deprecated. With more time, the severity of a "fault" may be considered higher, resulting in a corresponding push notification for remedial action.

A typical remediation for policy violations may be for customers to deallocate, update and redeploy their virtual machines with updated firmware. Options for pushing updates without the need of deallocation by additional control plane intervention on the compute host may also be provided. This may still require the update to be applied after a reboot. Additional remediation options may be based on scheduled updates or allowing customers to choose "always update to latest" policies for VM deployment. Updating to the latest policy may be done in the case of there being no firmware in virtual machine guest system. The latest firmware may then be used for the update. The expectation is that (1) the user/customer is relying on simplified firmware and (2) the user/customer can still choose to revert to a fixed specific version of firmware as and when required.

Figure 9:
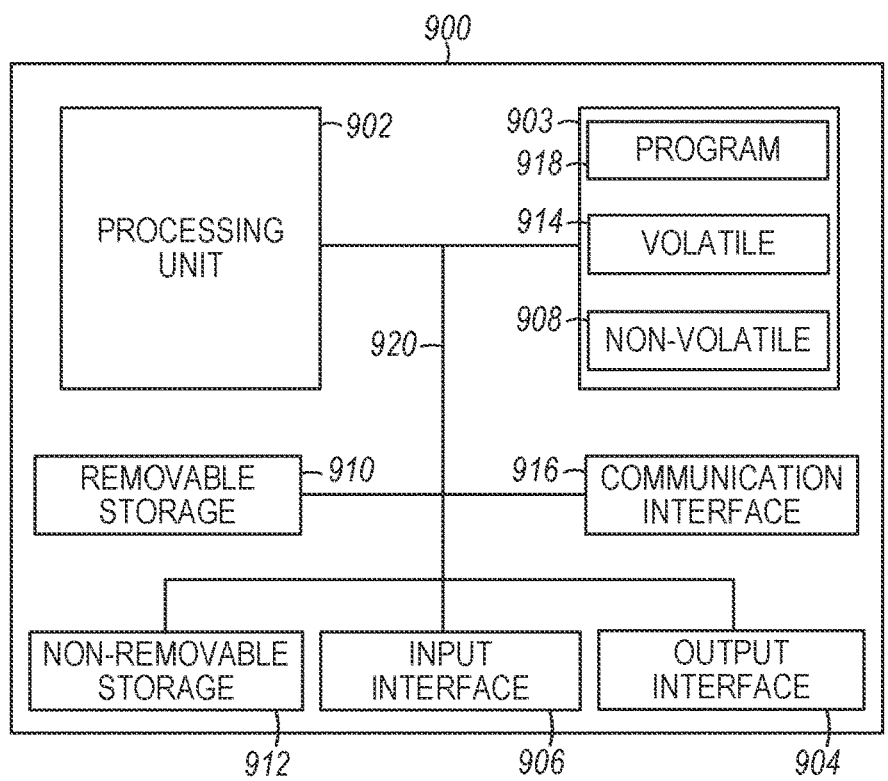
FIG. 9 is a block schematic diagram of a computer system to implement one or more example embodiments.

FIG. 9 is a block schematic diagram of a computer system 900 for providing a host environment for enabling use of user-controlled firmware for virtual machine deployment and for performing methods and algorithms according to example embodiments. All components need not be used in various embodiments.

One example computing device in the form of a computer 900 may include a processing unit 902, memory 903, removable storage 910, and non-removable storage 912. Although the example computing device is illustrated and described as computer 900, the computing device may be in different forms in different embodiments. For example, the computing device may instead be a smartphone, a tablet, smartwatch, smart storage device (SSD), or other computing device including the same or similar elements as illustrated and described with regard to FIG. 9. Devices, such as smartphones, tablets, and smartwatches, are generally collectively referred to as mobile devices or user equipment.

Although the various data storage elements are illustrated as part of the computer 900, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 903 may include volatile memory 914 and non-volatile memory 908. Computer 900 may include—or have access to a computing environment that includes—a variety of computer-readable media, such as volatile memory 914 and non-volatile memory 908, removable storage 910 and non-removable storage 912. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM). Digital Versatile Disks (DVD) or other optical disk storage, magnetic cassettes, magnetic tape, magnetic disk storage or other magnetic storage devices, or any other medium capable of storing computer-readable instructions.

Computer 900 may include or have access to a computing environment that includes input interface 906, output interface 904, and a communication interface 916. Output interface 904 may include a display device, such as a touchscreen, that also may serve as an input device. The input interface 906 may include one or more of a touchscreen, touchpad, mouse, keyboard, camera, one or more device-specific buttons, one or more sensors integrated within or coupled via wired or wireless data connections to the computer 900, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 900 are connected with a system bus 920.

Computer-readable instructions stored on a computer-readable medium are executable by the processing unit 902 of the computer 900, such as a program 918. The program 918 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 918 along with the workspace manager 922 may be used to cause processing unit 902 to perform one or more methods or algorithms described herein.

Examples

1. A computer implemented method includes receiving first firmware information at a hosting environment identifying that a user has selected user-controlled firmware for user virtual machines to be hosted on the hosting environment. A copy of the user-controlled firmware is obtained and a user virtual machine is deployed that includes the user-controlled firmware. The user-controlled firmware is locked against changes by the hosting environment absent receiving permission from the user.
2. The method of example 1 wherein receiving first firmware information includes generating a display of multiple choices of firmware for user selecting and receiving a selection of one of the multiple choices.
3. The method of example 2 and further including obtaining a hash of the user-controlled firmware.
4. The method of any of examples 1-3 wherein obtaining a copy of the user-controlled firmware includes receiving a copy of the user-controlled firmware from a user system.
5. The method of any of examples 1-4 wherein the user-controlled firmware is auditable by the user via a hash of the user-controlled firmware.
6. The method of any of examples 1-5 wherein obtaining a copy of the user-controlled firmware includes receiving an uploaded copy of the user-controlled firmware at the hosting environment.
7. The method of any of examples 1-6 and further including receiving permission to update the user-controlled firmware and applying an update to the user-controlled firmware in response to receiving permission.
8. The method of example 7 wherein receiving permission to update the user-controlled firmware includes receiving a user defined update policy and applying the user defined update policy to update the user-controlled firmware.
9. The method of any of examples 1-8 wherein the user-controlled firmware includes a hosting environment default firmware.
10. The method of example 9 and further including providing a hash of the hosting environment default firmware.
11. The method of any of examples 1-10 wherein the user virtual machine is a confidential virtual machine.
12. The method of example 11 wherein the confidential virtual machine includes a virtual trusted platform module (vTPM).
13. A machine-readable storage device has instructions for execution by a processor of a machine to cause the processor to perform operations to perform a method. The operations include receiving first firmware information at a hosting environment identifying that a user has selected user-controlled firmware for user virtual machines to be hosted on the hosting environment, accessing a copy of the user-controlled firmware, deploying a user virtual machine that includes the user-controlled firmware, identifying a firmware update, determining if user permission has been granted to apply the firmware update, and applying the firmware update to the user-controlled firmware in response to permission having been granted by the user.
14. The device of example 13 wherein receiving first firmware information includes generating a display of multiple choices of firmware for user selection, receiving a selection of one of the multiple choices, and obtaining a hash of the user-controlled firmware.
15. The device of any of examples 13-14 wherein determining if permission has been received to apply the firmware update includes receiving a user defined update policy and applying the user defined update policy to update the user-controlled firmware.
16. The device of any of examples 13-15 wherein the user virtual machine comprises a confidential virtual machine having a virtual trusted platform module (vTPM).
17. A device includes a processor and a memory device coupled to the processor and having a program stored thereon for execution by the processor to perform operations including receiving first firmware information at a hosting environment identifying that a user has selected user-controlled firmware for user virtual machines to be hosted on the hosting environment, obtaining a copy of the user-controlled firmware, deploying a user virtual machine that includes the user-controlled firmware, and locking the user-controlled firmware against changes by the hosting environment absent receiving permission from the user.
18. The device of example 17 wherein receiving first firmware information includes generating a display of multiple choices of firmware for user selecting, receiving a selection of one of the multiple choices, and obtaining a hash of the user-controlled firmware.
19. The device of any of examples 17-18 and further including receiving permission to update the user-controlled firmware and applying an update to the user-controlled firmware in response to receiving permission.
20. The device of example 19 wherein receiving permission includes receiving a user defined update policy and applying the user defined update policy to update the user-controlled firmware.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
   receiving first firmware information at a hosting environment identifying that a user has selected user-controlled firmware for user virtual machines to be hosted on the hosting environment;
   obtaining a copy of the user-controlled firmware;
   deploying a user virtual machine that includes the user-controlled firmware; and
   locking the user-controlled firmware against changes by the hosting environment absent receiving permission from the user.

2. The method of claim 1 wherein receiving first firmware information comprises:
   generating a display of multiple choices of firmware for user selecting; and
   receiving a selection of one of the multiple choices.

3. The method of claim 2 and further comprising obtaining a hash of the user-controlled firmware.

4. The method of claim 1 wherein obtaining a copy of the user-controlled firmware comprises receiving a copy of the user-controlled firmware from a user system.

5. The method of claim 1 wherein the user-controlled firmware is auditable by the user via a hash of the user-controlled firmware.

6. The method of claim 1 wherein obtaining a copy of the user-controlled firmware comprises receiving an uploaded copy of the user-controlled firmware at the hosting environment.

7. The method of claim 1 and further comprising:
   receiving permission to update the user-controlled firmware; and
   applying an update to the user-controlled firmware in response to receiving permission.

8. The method of claim 7 wherein receiving permission to update the user-controlled firmware:
   receiving a user defined update policy; and
   applying the user defined update policy to update the user-controlled firmware.

9. The method of claim 1 wherein the user-controlled firmware comprises a hosting environment default firmware.

10. The method of claim 9 and further comprising providing a hash of the hosting environment default firmware.

11. The method of claim 1 wherein the user virtual machine comprises a confidential virtual machine.

12. The method of claim 11 wherein the confidential virtual machine comprises a virtual trusted platform module (vTPM).

13. A machine-readable storage device having instructions for execution by a processor of a machine to cause the processor to perform operations to perform a method, the operations comprising:
    receiving first firmware information at a hosting environment identifying that a user has selected user-controlled firmware for user virtual machines to be hosted on the hosting environment;
    accessing a copy of the user-controlled firmware;
    deploying a user virtual machine that includes the user-controlled firmware;
    identifying a firmware update;
    determining if user permission has been granted to apply the firmware update; and
    applying the firmware update to the user-controlled firmware in response to permission having been granted by the user.

14. The device of claim 13 wherein receiving first firmware information comprises:
    generating a display of multiple choices of firmware for user selection;
    receiving a selection of one of the multiple choices; and
    obtaining a hash of the user-controlled firmware.

15. The device of claim 13 wherein determining if permission has been received to apply the firmware update comprises:
    receiving a user defined update policy; and
    applying the user defined update policy to update the user-controlled firmware.

16. The device of claim 13 wherein the user virtual machine comprises a confidential virtual machine having a virtual trusted platform module (vTPM).

17. A device comprising:
a processor; and
a memory device coupled to the processor and having a program stored thereon for execution by the processor to perform operations comprising:
  receiving first firmware information at a hosting environment identifying that a user has selected user-controlled firmware for user virtual machines to be hosted on the hosting environment;
  obtaining a copy of the user-controlled firmware;
  deploying a user virtual machine that includes the user-controlled firmware; and
  locking the user-controlled firmware against changes by the hosting environment absent receiving permission from the user.

18. The device of claim 17 wherein receiving first firmware information comprises:
  generating a display of multiple choices of firmware for user selecting;
  receiving a selection of one of the multiple choices; and
  obtaining a hash of the user-controlled firmware.

19. The device of claim 17 and further comprising:
  receiving permission to update the user-controlled firmware; and
  applying an update to the user-controlled firmware in response to receiving permission.

20. The device of claim 19 wherein receiving permission comprises:
  receiving a user defined update policy; and
  applying the user defined update policy to update the user-controlled firmware.

* * * * *